US011740906B2

(12) United States Patent
Goudarzi et al.

(10) Patent No.: US 11,740,906 B2
(45) Date of Patent: Aug. 29, 2023

(54) METHODS AND SYSTEMS FOR NESTED STREAM PREFETCHING FOR GENERAL PURPOSE CENTRAL PROCESSING UNITS (71) Applicant: HUAWEI TECHNOLOGIES CO., LTD., Shenzhen (CN)

(72) Inventors: Maziar Goudarzi, Toronto (CA); Zhizhao Qian, Markham (CA); Reza Azimi, Aurora (CA); Billy Mengxuan Cai, Markham (CA); Man Pok Ho, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/677,413

(22) Filed: Feb. 22, 2022

(65) Prior Publication Data
US 2022/0269508 A1  Aug. 25, 2022

Related U.S. Application Data (60) Provisional application No. 63/153,640, filed on Feb. 25, 2021.

(51) Int. Cl.
*G06F 9/38* (2018.01)
*G06F 8/41* (2018.01)
(Continued)

(52) U.S. Cl.
CPC .......... *G06F 9/3814* (2013.01); *G06F 8/4452* (2013.01); *G06F 9/30047* (2013.01); *G06F 9/325* (2013.01); *G06F 12/0862* (2013.01)

(58) Field of Classification Search
CPC .. G06F 9/3814; G06F 8/4452; G06F 9/30047; G06F 9/325; G06F 9/30065; G06F 9/383; G06F 8/4442
See application file for complete search history.

(56) References Cited

U.S. PATENT DOCUMENTS 7,487,296 B1 *  2/2009  Iacobovici .............. G06F 9/383
                                                    712/207
7,533,242 B1 *  5/2009  Moll ....................... G06F 9/383
                                                    711/213
(Continued)

FOREIGN PATENT DOCUMENTS

EP          1050804 A1     11/2000

OTHER PUBLICATIONS

F. Schuiki, F. Zaruba, T. Hoefler and L. Benini, "Stream Semantic Registers: A Lightweight RISC-V ISA Extension Achieving Full Compute Utilization in Single-Issue Cores" in IEEE Transactions on Computers, vol. 70, No. 02, 16 pages, 2021.

(Continued)

*Primary Examiner* — Shawn Doman (57) ABSTRACT

A method and hardware system to remove the overhead caused by having stream handling instructions in nested loops. Where code contains inner loops, nested in outer loops, a compiler pass identifies qualified nested streams and generates ISA specific instructions for transferring stream information linking an inner loop stream with an outer loop stream, to hardware components of a co-designed prefetcher. The hardware components include a frontend able to decode and execute instructions for a stream linking information transfer mechanism, a stream engine unit with a streams configuration table (SCT) having a field for allowing a subordinate stream to stay pending for values from its master stream, and a stream prefetch manager with buffers for storing values of current elements of a master stream, and with a nested streams control unit for reconfiguring and iterating the streams.

12 Claims, 9 Drawing Sheets

(51) Int. Cl.
    *G06F 9/30*     (2018.01)
    *G06F 9/32*     (2018.01)
    *G06F 12/0862*     (2016.01)

(56) References Cited

U.S. PATENT DOCUMENTS

| | | | |
|---|---|---|---|
| 8,364,902 B2* | 1/2013 | Hooker | G06F 12/0862 |
| | | | 712/207 |
| 2006/0048120 A1 | 3/2006 | Archambault et al. | |
| 2006/0179238 A1* | 8/2006 | Griswell, Jr. | G06F 9/30043 |
| | | | 712/E9.047 |
| 2007/0204108 A1* | 8/2007 | Griswell, Jr. | G06F 12/0862 |
| | | | 711/137 |
| 2007/0239975 A1 | 10/2007 | Wang | |
| 2013/0179663 A1 | 7/2013 | Heisch | |
| 2013/0185516 A1 | 7/2013 | Sassone et al. | |
| 2014/0189249 A1* | 7/2014 | Ye | G06F 12/0862 |
| | | | 711/137 |
| 2015/0089149 A1* | 3/2015 | Kimura | G06F 12/0862 |
| | | | 711/137 |
| 2018/0165204 A1* | 6/2018 | Venkatesh | G06F 12/084 |

OTHER PUBLICATIONS

Z. Wang and T. Nowalzki, "Stream-based Memory Access Specialization for General Purpose Processors," in 2019 ACM/IEEE 46th Annual International Symposium on Computer Architecture (ISCA), Phoenix, AZ, USA, 2019 14 pages.

James E. Smith, Decoupled Access/Execute Computer Architectures, ACM Transactions on Computer Systems, ACM SIGARCH Computer Architecture News, vol. 10, Issue 3, Apr. 1982, pp. 112-119.

T. J. Ham, J. L. Aragon and M. Martonosi, "DeSC: Decoupled supply-compute communication management for heterogeneous architectures," 2015 48th Annual IEEE/ACM International Symposium on Microarchitecture (MICRO), Waikiki, HI, USA, 2015, 13 pages.

* cited by examiner

METHODS AND SYSTEMS FOR NESTED STREAM PREFETCHING FOR GENERAL PURPOSE CENTRAL PROCESSING UNITS

RELATED APPLICATIONS

This application claims the benefit of and priority to U.S. Provisional application Ser. No. 63/153,640 filed Feb. 25, 2021, the entire contents of which are hereby incorporated by reference.

FIELD OF THE INVENTION

This invention pertains generally to the field of high-performance computing and in particular, to methods and systems for reducing the overhead of prefetch operations for nested loops.

BACKGROUND

Array-based memory accesses are common in the loops of many benchmarks. However, many benchmarks further include indirect memory accesses which can, in the case of hot loops, can cause misses and memory access latencies. These can significantly impact a central processing unit's (CPU) benchmark performance.

As an illustrative example, an indirect memory access can be illustrated with the following code excerpt:

```
001 for (i = 0; i < M; i++) {
002     for (j = row_start[i]; j < row_start[i +1]; j++) {
003     y[i] += values[j] * x[ col_idx[j] ];
004     }
005 }
```

The above code excerpt contains an outer loop incremented by variable i at lines 001 to 005, and an inner loop, i.e. a nested loop, incremented by variable j, at lines 002 to 004. The x[col_idx[j]] instruction is an indirect memory access, because the x[ . . . ] refers directly to col_idx[ . . . ], but indirectly to j. If the values of the col_idx[j] array are not sequential, the memory accesses can be difficult to handle for a hardware prefetcher and this is a limitation of the prior art.

A stream, in this patent application, is an array in a loop that is indexed, directly or indirectly, by an induction variable of that loop. Such an array constitutes a stream in that loop, and it can respectively be referred to as a "direct stream" or an "indirect stream".

Indirect-stream prefetching using a software-hardware co-design, also referred to as "co-designed prefetching" for short, is a technique that can be used to address this issue. The relationship among the arrays and the induction variable of a loop can be passed on to a stream-prefetching unit in the hardware, that can prefetch the col_idx[j] values in time, and then prefetch the x[ col_idx[j] ] values, before the CPU gets to consume it.

The following pseudo-code illustrates how co-designed prefetching can work. It contains an outer loop from lines 010 to 100, and an inner loop, i.e. a nested loop, from lines 060 to 080. With conventional prefetching techniques, stream-handling instructions, used for passing streams information to hardware, can only be placed at the same level as an inner loop. In other words, the inner loop is "wrapped" with the stream-handling instructions. Such stream-handling instructions are represented at lines 020, 030, 040, 050, and 090.

```
010 for (i = 0; i < M; i++) {
020     streamOpen ( s_j, ST_BASE );
030     streamOpen ( s_values, ST_DIRECT, s_j );
040     streamOpen ( s_col_idx, ST_DIRECT, s_j );
050     streamOpen ( s_x, ST_INDIRECT, s_col_idx );
060     for (j = row_start[i]; j < row_start[i+1]; j++) {
070         y[i] += values[j] * x[ col_idx[j] ];
080     }
090     streamClose( s_j ); // closing the entire stream tree
100 }
```

There are many cases where the trip-count of an inner loop is small, but the trip-count of an associated outer loop is comparatively larger. Consequently, the stream-handling instructions, such as streamOpen and streamClose in the preceding example, can cause an overhead so high that the potential gain by prefetching is significantly reduced, and in some cases, it can even be lost altogether. The amount of overhead depends on each specific case, but measurements on a cycle-accurate model of a modern out-of-order processor core, for running the symmetric Gauss-Seidel (SymGS) benchmark on a real-world dataset, has shown that such an overhead can include as much as 10% more instructions, and a 52% greater cycle-count.

Therefore, there is a need for methods and/or systems that can obviate or mitigate one or more limitations of the prior art, such as the overhead caused by misses and memory access latencies that can result from frequent indirect memory accesses.

This background information is provided to reveal information believed by the applicant to be of possible relevance to the present invention. No admission is necessarily intended, nor should be construed, that any of the preceding information constitutes prior art against the present invention.

SUMMARY

Methods and systems are provided to reduce the overhead of code execution by having stream handling instructions removed from unnecessary iterations. Using a compiler analysis according to embodiments, information linking streams in inner loops with streams of outer loops can be identified, and transferred to hardware units of a prefetcher according to embodiments, using a transfer mechanism. Once the stream linking information has been transferred, the hardware units can prefetch inner stream data and a stream handling instructions can be performed outside an inner loop.

An aspect of the disclosure provides a method of prefetching data called by a stream in an inner loop, the inner loop nested in an outer loop of executable code, that includes: identifying, with a compiler analysis, stream linking information defining how the stream in the inner loop is linked to a stream in the outer loop; transferring the stream linking information from the executable code to hardware units of a prefetcher; and prefetching the data using the stream linking information and the hardware units of a prefetcher. According to some embodiments, an inner loop stream can be a subordinate stream to the outer loop stream, an outer loop stream can be a master stream to an inner loop stream, and stream linking information defining how a stream in an inner loop is linked to a stream in an outer loop can include: a subordinate stream identification; a master stream identification, providing an initial value for the subordinate stream's induction variable: an initial value for the subordinate stream identification's, coming from the master stream's identification; a master stream identification, providing an end value for the subordinate stream's induction variable; and an end value for the subordinate stream identification, coming from the master stream's identification; a subordinate stream being a stream in an inner loop that is changed at each iteration of the outer loop, and a master stream being a stream in an outer loop that can change one of: the initial value of the subordinate stream's induction variable; and the end value of the subordinate stream's induction variable; the base address of the subordinate stream. According to some embodiments, an inner loop stream can be a subordinate stream to an outer loop stream, an outer loop stream can be a master stream to an inner loop stream, and stream linking information defining how a stream in an inner loop is linked to a stream in an outer loop can include: an identification for the subordinate stream, and an identification for the master stream, the identification for the master stream providing a base address for the identification of the subordinate stream. According to some embodiments, a compiler analysis of an executable code can include: identifying an inner stream candidate, being a stream in an inner loop, the inner loop nested in an outer loop; determining whether the inner stream candidate corresponds to a qualified nested loop scenario; identifying the outer stream candidate, being a stream in the outer loop nesting the inner loop; using information from the candidate streams to create a stream dependency tree; identifying stream linking information defining how the inner stream is linked to the outer stream; generating stream handling instructions for an intermediate representation code; inserting the stream handling instructions in the intermediate representation code; where a qualified nested loop scenario is a scenario for which applying a method of an embodiment can reduce the number of times a stream handling instruction is executed. According to some embodiments, the properties of a qualified nested loop scenario can include: an outer loop containing only innermost loops; an outer loop having not previously been selected for a corresponding stream handling instruction to be inserted according to a prefetcher's instruction set architecture; and an inner loop stream being potentially linked to the outer loop stream with information including at least one of: an initial value for an induction variable, a final value for an induction variable, and a base address. According to some embodiments, a compiler analysis of an executable code can further include eliminating a stream in an outer loop, that is not linked to a stream in an inner loop. According to some embodiments, a compiler analysis of an executable code can further include eliminating a stream that is missing required stream linking information. According to some embodiments, a compiler analysis of an executable code can further include compiling the intermediate representation code into code executable by the instruction set architecture of a selected prefetcher. According to some embodiments, a compiler analysis of an executable code can further include eliminating a stream candidate not meeting certain criteria, criteria being: for a stream candidate having an induction variable, containing a loop-invariant start value, a loop-invariant end value, and a loop-invariant increment value; for a stream candidate that is a direct stream, containing a loop-invariant base address; for a stream candidate that is an indirect stream, containing a loop-invariant base address; and having an index, the calculation of which performs types of arithmetic operations that are supported by a prefetcher's implemented arithmetic units. According to some embodiments, transferring stream linking information from an executable code to hardware units of a prefetcher can include: receiving with the prefetcher, executable code containing stream linking information, the executable code having been compiled for the instruction set architecture of the prefetcher; executing the code with the prefetcher; recording the stream linking information from the executable code in a stream configuration table (SCT); reading the stream linking information from the SCT, with a stream prefetch manager. According to some embodiments, transferring stream linking information from an executable code to hardware units of a prefetcher can include, for each stream having stream linking information in the SCT, while an outer loop is being iterated: producing prefetches to bring data to a cache; fetching data from a cache and storing it in buffers; producing a prefetch for each iteration of the loop. According to some embodiments, transferring stream linking information from an executable code to hardware units of a prefetcher can include, for each stream having stream linking information in the SCT, while an inner loop is being iterated: reconfiguring an inner loop stream prefetcher using the stream linking information; prefetching for arrays in the inner loop until all iterations are completed. According to some embodiments, transferring stream linking information from an executable code to hardware units of a prefetcher can be performed through a mechanism available with the instruction set architecture (ISA) of the processor incorporating the prefetcher.

An aspect of the disclosure provides a hardware system that can include: a co-designed prefetcher frontend operative to: receive an executable code containing stream linking information, the executable code having been compiled for the instruction set architecture of the co-designed prefetcher; execute the code; record the stream linking information from the executable code in a stream configuration table (SCT); and a stream engine unit containing: a stream configuration table (SCT) in which to record stream linking information from the executable code, and having a field for inner loop streams to stay pending for values from an outer loop stream; and a stream prefetch manager containing: buffers for storing data of an outer stream, and a nested streams control unit operative for: reconfiguring an inner loop stream, and prefetching for arrays in the inner loop until all iterations are completed.

DETAILED DESCRIPTION

Methods and systems according to embodiments can allow stream-handling instructions to be added at the level of an outer loop, instead of an inner loop, such that the stream-handling instructions are not unnecessarily iterated in a loop. As such, embodiments can completely remove the overhead associated with co-designed prefetching techniques of the prior art.

Using embodiments, prefetching can be performed for short inner loops that are costly for software prefetchers, as well as for inner loops that are too short for hardware prefetchers to capture.

Further, embodiments can allow a prefetching engine, also referred to as a stream-engine unit, to run ahead of a processor core, and start the prefetching of inner loop arrays corresponding to future iterations of an outer loop. This goes beyond the capabilities of conventional hardware prefetchers because by design, conventional hardware prefetchers can only learn and repeat memory accesses after having observed them, and this inherently renders them unable to adapt to future sequences of an inner loop.

An array of an inner loop, an induction variable of an inner loop, or both, can be reconfigured at each iteration of an outer loop. This can occur for example while an embodiment is executing the symmetric Gauss-Seidel (SymGS) benchmark, or the PENNANT benchmark, PENNANT being an application operating on unstructured, finite element meshes with arbitrary polygons. But such reconfiguration can also be performed with many other applications. Using an embodiment, the relationship between the arrays in an inner loop and the arrays outside the inner loop, but inside an outer loop, can be identified during a compiler's code analysis, which is performed as part of the process of translating a source code into the machine code of a selected system. This part of a compiling process can generally be referred to as a compiler analysis. An instruction, or another mechanism, for passing inner loop-outer-loop relationship information to hardware can then be introduced, and using an appropriate extension of the processor's micro-architecture, that additional information can be used when generating prefetches. Following these steps, stream-handling instructions can be executed at the outer loop level, instead of the inner loop level, while prefetching can still be covered for both the outer and the inner loops. As a result, not only can the overhead be removed altogether, but a prefetching unit can be enabled to prefetch for future executions of the inner loop. These capabilities are beyond the reach of currently existing hardware prefetchers.

A software part of an embodiment can be illustrated with the following pseudo-code, which would apply to the previous example code discussed. Line 180, which is a stream-handling instruction, is written at the level of an outer loop (i.e. lines 190-230), instead of an inner loop (lines 200 to 220), and this is allowed by a method of an embodiment.

```
110     streamOpen ( s_i, ST_BASE );
120     streamOpen ( s_row_start, ST_ DIRECT, s_i);
130     streamOpen ( s_row_end, ST_DIRECT, s_i);
140     streamOpen ( s_j, ST_BASE );
150     streamOpen ( s_values, ST_DIRECT, s_j);
```

-continued

```
160     streamOpen ( s_col_idx, ST_DIRECT, s_j);
170     streamOpen ( s_x, ST_INDIRECT, s_col_idx);
180     streamLink ( s_j, ST_BASE, s_row_start, true, s_row_end,
        true);
190     for (i = 0; i < M; i++) {
200        for (j = row_start[i]; j < row_start[i+1]; j++) {
210           y[i] += values[j] * x[ col_idx[j] ];
220        }
230     }
240     streamClose(s_j);//closing stream tree stemming at j
250     streamClose(s_i);//closing stream tree stemming at i
```

The following is an example of source code from the SymGS benchmark, for which an embodiment can be implemented. Lines 220, 230 and 240 are code in the outer loop (lines 210 to 330), that can reconfigure streams in the inner loop (lines 270 to 300).

```
210     for (int i=0; i< nrow; i++) {
220        const double * const currentValues = matrixValues[i];
230        const int * const currentColIndices = mtxInd[i];
240        const int currentNumberOfNonzeroes =
               nonzeroesInRows[i];
250        const double currentDiagonal = 26;
260        double sum = rv[i]; //RHS value
270        for (int j =0 ; j< currentNumberOfZeroes; j++) {
280           int curCol = currentColIndicespj[;
290           sum -= currentValeus[j] * xv[curCol];
300        }
310        Sum += xv[i]*currentDiagonal;
320        xv[ ] = sum/current/currentDiagonal;
330     }
```

Figures 1A, 1B:
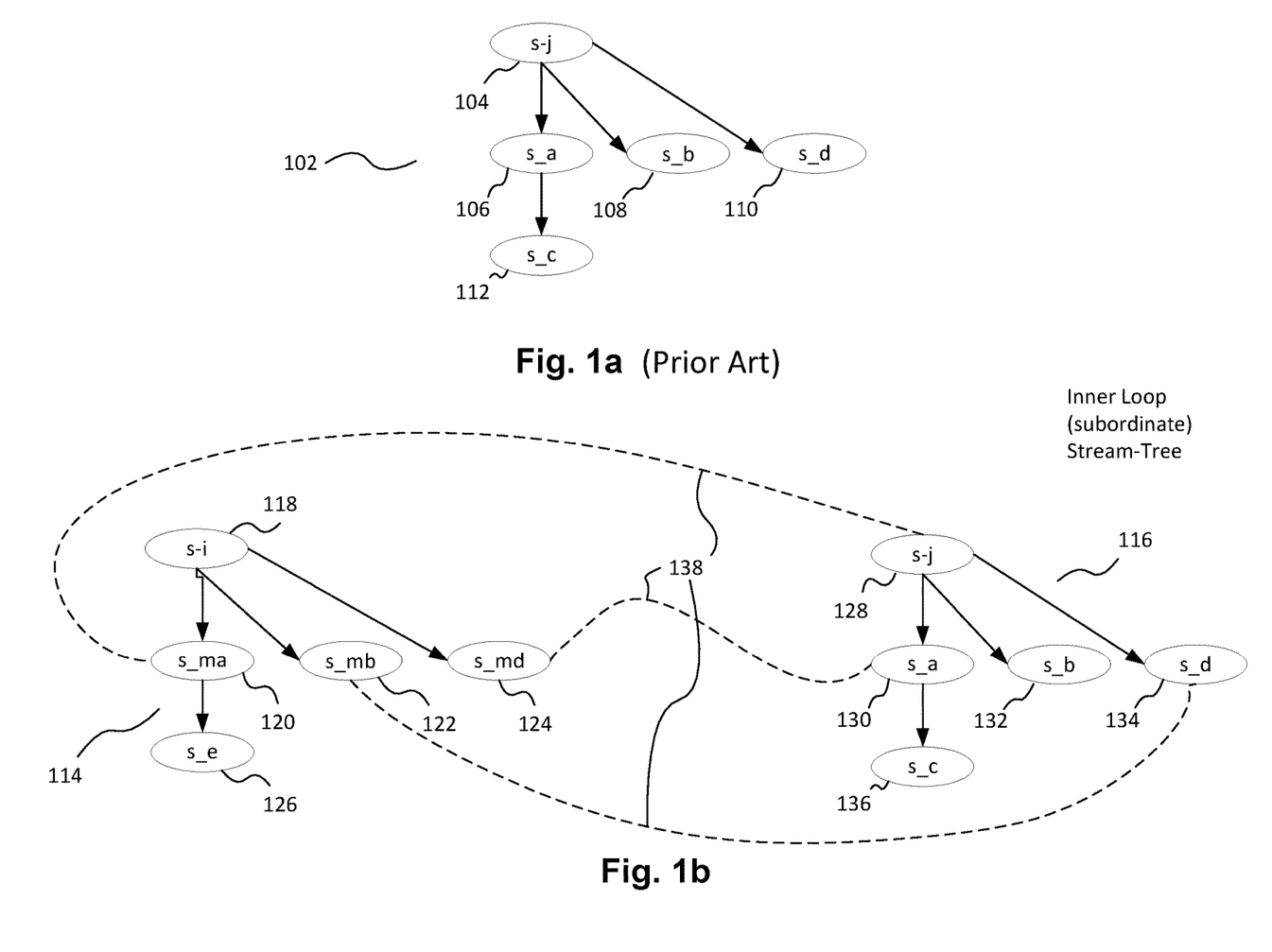
FIG. 1a depicts streams in a single-parent stream tree.
FIG. 1b depicts relationship between an outer-loop stream-tree, an inner-loop stream-tree, and master and subordinate streams within, according to an embodiment.

FIG. 1a depicts streams and possible relationships between them, in a single-parent stream tree 102. Variable j is an induction variable and it corresponds to the s_j stream 104, which has three direct streams: s_a 106, s_b 108, s_d 110, and one indirect stream s_c 112.

In an embodiment, a master stream is a stream in an outer loop that can change one of the following items in an inner loop.
  For an inner loop's induction variable, a master stream can change either the initial value or the end value of the induction variable;
  For another stream, a master stream can change the base address of the array being accessed.

In an embodiment, a subordinate stream is a stream in an inner loop that is changed at each iteration of the outer loop. As with a master stream, an induction variable and any direct or indirect stream in an inner loop, can be a subordinate stream.

A master-subordinate relationship between an outer loop stream and an inner loop stream can be referred to as "stream-linking information" and the act of passing stream-linking information from software to hardware can be referred to as a "linking of streams". Embodiments can address the following points:
  identifying, capturing, and/or extracting stream-linking information from a source code;
  passing stream-linking information to hardware.

For removing the overhead caused by unnecessary reiterations of stream-handling instructions, embodiments can insert the stream-handling instructions at the outer loop level, without inserting it at the inner loop level. Thus, embodiments include a system that can mimic the execution of an inner loop, and when the execution of the inner loop is complete, the system can automatically renew the subordinate streams for prefetching.

In embodiments, such execution and renewal can be performed by an additional run-ahead prefetcher in a hardware unit, rather than by software execution with the CPU.

FIG. 1b is a depiction of the relationship between an outer-loop stream-tree 114, an inner-loop stream-tree 116, and master and subordinate streams within, according to an embodiment. The outer loop induction variable is i and it corresponds to the s_i stream 118. It has three direct streams: s_ma 120, s_mb 122, s_md 124, and one indirect stream s_e 126. The inner loop induction variable is j and it corresponds to the s_j stream 128. It has three direct streams: s_a 130, s_b 132, and s_d 134, and one indirect stream s_c 136. In an embodiment, not all streams are necessarily a master or a subordinate in either stream-tree. A master stream can reconfigure 138 subordinate streams at each iteration of the outer loop.

An embodiment can include any number of the following elements:
- Methods of overall operation, and related concepts detailing how elements of an embodiment can operate.
- Methods covering how software-identified stream-linking information for a nested-stream can be passed on to hardware components, for an instruction set architecture (ISA),
- Methods for a compiler pass to identify stream-linking information from a program's source code.
- Hardware systems including components added to a processor micro-architecture, for supporting the transfer and use of stream-linking information for prefetching.

Figure 1C:
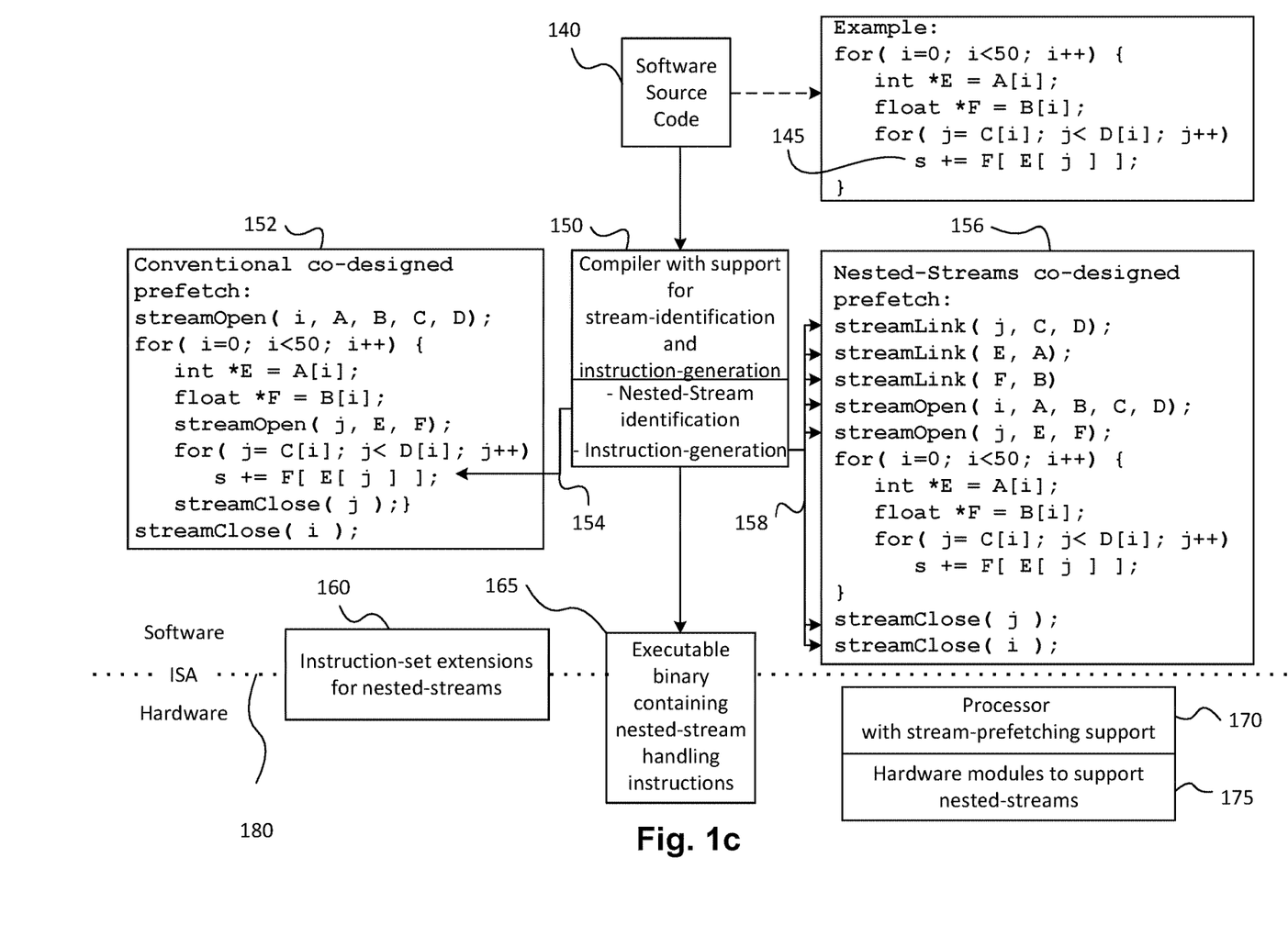
FIG. 1c is a flowchart illustrating how various elements of an embodiment can operate collectively, according to an embodiment.

FIG. 1c is a flowchart illustrating how elements of an embodiment can operate collectively. An executable software source code 140 can contain an outer loop and an inner loop and each loop can contain a stream, the two of which are linked 145. The source code can be processed by a compiler 150 having support to identify streams and to generate stream handling instructions for a selected instruction set architecture (ISA). For example, the compiler 150 can identify in sample code 152 a stream "F[E[j]]" 154, and it can generate in sample code 156 stream handling instructions 158. An embodiment can contain extensions for nested streams, and these extensions can be for a selected instruction set architecture (ISA) 160. This can allow a compiler to generate a binary code file containing the nested streams 165, that is executable by the ISA. An executable binary code file can then be executed by a processor with stream-prefetching support 170, with assistance from hardware modules designed to support nested streams 175. In FIG. 1c, a dotted line 180 represents an abstract interface between software elements and hardware elements of an embodiment, and the ISA that links them.

In an embodiment of co-designed stream prefetching, the lifecycle of each stream can be composed of three parts: opening the stream, stepping the stream, and closing the stream.
- "Opening" a stream refers to when configuration information is passed from software to hardware and the hardware then starts generating prefetch requests for the data elements of that stream.
- "Stepping" a stream refers to when a corresponding induction variable iterates to its next value.
- "Closing" a stream refers to when the stream finishes, either because:
  - the corresponding induction variable has reached its end-value if known, or
  - the processor core has exited the loop and is executing a streamClose( ) software instruction.

For a master stream and a subordinate stream, a stream lifecycle can be as follows.

For a master stream, the data elements are quickly needed for reconfiguring subordinate streams. Therefore, the data elements are kept in in-hardware buffers of an embodiment, that can be called headVal[ ]. A lifecycle can correspondingly change as follows:
- Opening a master stream can either refer to when first data elements are read from a cache if that's where they're located, or when a prefetch is generated for the first data elements. When data is readied, it is stored in headVal[ ] buffers.
- Stepping a master stream occurs when all headVal[ ] buffers are first invalidated, and then updated by new values corresponding to the new value of an induction variable. If needed, prefetch requests can be generated for the values missing in the cache.
- Closing a master stream refers to when all headVal[ ] buffers of an embodiment are invalidated.

For a subordinate stream, configuration data can come from one or more master streams. This data can include an initial value and an end value for a subordinate stream's induction variable, as well as base addresses for subordinate direct streams or subordinate indirect streams.
- Opening a subordinate stream is when the latest configuration values are obtained from a headVal[ ] buffer of a master stream. If the values are not ready, the subordinate stream can stay pending to get initialized.
- Stepping a subordinate stream refers to when a corresponding induction variable iterates to its subsequent value.
- Closing a subordinate stream can occur when the master-stream is stepped. This can be performed irrespective of the processor core executing the loops software, and hence, it can allow the prefetcher of an embodiment to run-ahead of the processor. The master streams can again be consulted, and if the outer loop is not finished, the new values of configuration data can be obtained from headVal[ ] buffers in a similar manner as with a new Opening operation. Similarly, if the data is not ready, a subordinate stream can again stay pending to initialize.

The above concepts of "opening", "stepping" and "closing", when referring to a "master stream" or a "subordinate stream", can allow a high-level description of a system's mechanics and operation according to embodiments, as well as the benefits these can provide.

In an embodiment, a mechanism can allow stream linking information to be transferred to hardware. Different instruction set architecture (ISA) make available different mechanisms to choose from, but whether a separate new instruction is added to the ISA 180, or another mechanism is used, the mechanism transferring the stream linking information from the executable code to hardware units of a prefetcher can be performed through a mechanism available with the instruction set architecture (ISA) of the processor incorporating the prefetcher, and can be referred to as a "streamLink" mechanism, which refers to instructions for a stream-linking information transfer mechanism.

In an embodiment, a streamLink mechanism can allow the configuration data of the streams in a subordinate, inner stream tree to get updated, from streams in a master, outer stream tree. The renewal time, also referred to as the reconfiguration time, can be when the base stream of a subordinate stream tree finishes its current iteration. Consequently, the subordinate stream tree can be renewed, and start over without additional software instructions.

In an embodiment, hardware 175 can be instructed as to which master stream is linked to which subordinate stream, so that when a subordinate stream is being opened or renewed, the hardware 175 can know from which stream it should get the new configuration data.

In an embodiment, the list of information to be passed from software to hardware can be summarized as follows:

In a case where a subordinate stream is an induction variable of an inner loop, both the initial-value and the end-value can originate from a master stream, and the stream linking information to be transferred from software to hardware can be:

streamLink(sid, ST_BASE, msid_initVal, initValIsLinked, msid_endVal, endValIsLinked)
<sid>: a subordinate stream identification;
ST_BASE a BASE stream, showing that this information is regarding the induction variable;
<msid_initVal>: a master stream identification, providing an initial value for the subordinate stream's induction variable (initVal);
<initValIsLinked>: an initial value for the subordinate stream identification, coming from the master stream's identification <msid_initVal>, and being a Boolean;
<msid_endVal>: a master stream identification providing an end-value for the induction variable (endVal);
<endValIsLinked>: an end value for the subordinate stream identification <sid>, coming from the master stream identification providing an end value for the induction variable <msid_endVal>, and being a Boolean.

In a case where a subordinate stream is a dependent stream, either directly or indirectly, only the base-address of the array can originate from a master stream, and the stream linking information to be transferred from software to hardware can be an identification for the subordinate stream and an identification for the master stream, such as:

streamLink(sid, ST_DIRECT, msid), if the link is direct; and
streamLink(sid, ST_INDIRECT, msid), if the link is indirect.
An identification for the master stream <msid> can provide a base address baseAddr for the identification of a subordinate stream <sid>.

An embodiment can include an interface between software and hardware 180. The choice of an actual mechanism to realize such interface is dependent on the architecture to which an embodiment is to be applied, and even with a given architecture, different design choices are possible, and each possibility has its own distinct overheads and benefits.

An embodiment can include various configurations of choices for mechanisms, including mechanisms having a low runtime overhead, a clear save/restore possibility during context-switches, and/or support for special cases arising upon function calls and thread-switching.

In an embodiment, a mechanism is operative with a Aarch64 processor architecture and the data format in a streamLink mechanism can use model-specific register (MSR) instructions for an AArch64 architecture. The AArch64 architecture is a 64-bit extension for version 8 of the well-known Advanced RISC Machine architecture (ARM V8). The instructions employed can be MSR instructions, which can move an architecture register to a system register. In an embodiment, the architecture register can be "x1" and the system register can be "STRM_CR_EL0". A command can be as follows:

MSR STRM_CR_EL0, x1
where STRM_CR_EL0 is a system control register for a stream engine unit (SEU), accessible at the execution level zero "EL0". The contents of "x1" can be a master-subordinate relationship between streams.

Figure 2:
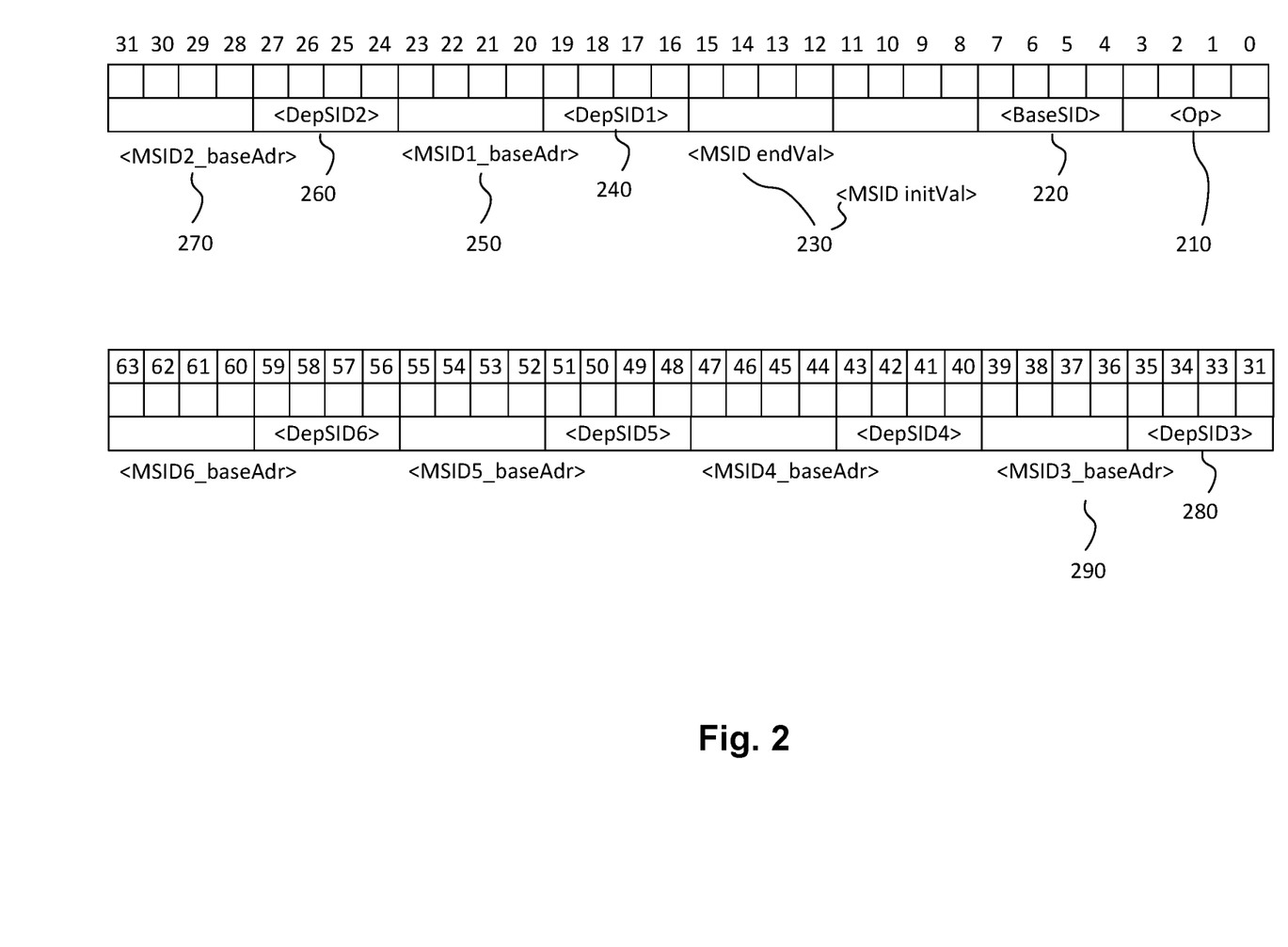
FIG. 2 shows the data format in a sample implementation of a stream-linking information transfer ("streamLink") mechanism in an AArch64 instruction set architecture (ISA), according to an embodiment.

FIG. 2 shows the data format in a sample implementation of a streamLink instruction in the AArch64 instruction set architecture (ISA), according to an embodiment. The <op> field 210 identifies that this is a streamLink operation. The other fields each contain either subordinate stream identification (SID) 220, 240, 260, 280, etc. or master stream identification (MSID) 230, 250, 270, 290, etc., and in FIG. 2, any field of SID is followed by fields of MSID.

Embodiments can include a compiler pass 150 as described hereunder. Further, a compiler containing a compiler pass as described hereunder can be an embodiment, and a compiler pass can be an embodiment by itself. A task of a compiler pass can be to identify streams and then insert specific stream-handling instructions for transferring information about the streams to a stream engine unit (SEU), as well as instructions for configuring an automated prefetching.

In embodiments, a compiler pass can identify master and subordinate streams, and the stream linking information that relates them. A compiler pass can also hoist base addresses from an inner loop to an outer loop. A compiler can also generate streamLink instructions.

Figure 3:
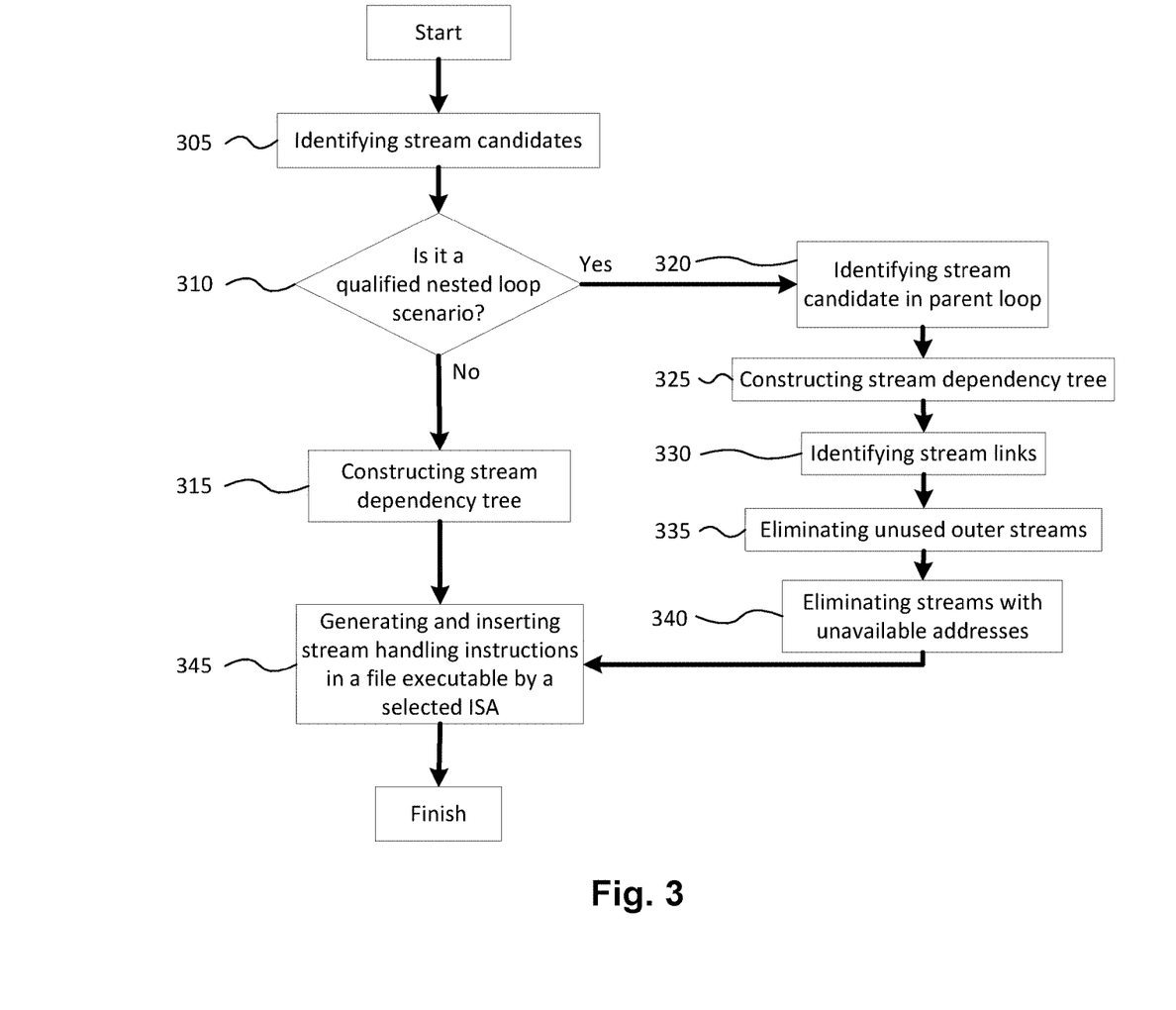
FIG. 3 is a flow chart for a compiler pass, according to an embodiment.

FIG. 3 represents a workflow for a compiler pass, according to an embodiment. The workflow can be performed for any innermost loop in a given function. As an initial step, the stream candidates in an inner loop can be identified 305. For this step 305, a depth-first search (DFS) identification method can be used. The method can start from every "load" instruction in a loop, step backwards through a data dependence graph, and check whether each "load" instruction is ultimately dependent on an induction variable of the loop. A "load" instruction that is dependent on the induction variable is a stream candidate.

Once a stream candidate of the innermost loop is identified, the compiler can determine whether the inner stream candidate is corresponds to a qualified nested loop scenario 310. In an embodiment, a nested loop scenario can be qualified 310 if the following conditions are true:

The outer loop contains only innermost loops, i.e. there are no further nested loops within the parent outer loop.
The outer loop has not previously been selected for a corresponding instruction to be inserted according to a prefetcher's ISA. If a qualified outer loop has been selected for a corresponding instruction to be inserted according to a pre-fetcher's ISA, then its inner loops are included. A single compiler pass for each qualified outer loop is sufficient.
The inner loop stream can potentially be linked to the outer loop stream with information including at least one of an initial value for an induction variable, a final value for an induction variable, as well as a base address.

If the nested loop scenario is not qualified, a work flow can proceed to construct a stream dependency tree 315 from only the stream candidates of an innermost loop.

In the case where a nested loop nested loop is qualified, the outer loop nesting the inner loop can be identified and analyzed for further stream candidates 320. Information from the candidate streams can then be used to create a stream dependency tree 325.

During the construction of a stream dependency tree, whether the scenario is for a nested loop or not 310, a tree structure can be created, based on the identified stream candidates. At this stage, if certain criteria are not met, some candidates can be removed. Such criteria can include:

- if the stream candidate has an induction variable, it must contain a loop-invariant start value, a loop-invariant end values, and loop-invariant increment values;
- if the stream candidate is a direct stream, it must contain a loop-invariant base address;
- if the stream candidate is an indirect stream, it must also contain a loop-invariant base address;
- the stream candidate must have an index, the calculation of which performs types of arithmetic operations that are supported by a prefetcher's implemented arithmetic units.

When a stream candidate is removed due to criteria being unmet, a sub-tree, whose root is this stream itself, can also be removed. The potential distinction between the cases of a nested loop being qualified or not 310, is the number of induction variable streams, because if a nested loop is indeed qualified, the outer loops and inner loops all have induction variables of their own.

In the case of a qualified nested loop 310, once a stream tree is formed 325, a compiler pass can identify stream linking information defining how an inner stream is linked to an outer stream 330. This can create internal data structures for recording the dependency information between the output values of outer streams to:

- initial or end values of inner induction variable streams;
- base addresses of inner direct or inner indirect streams.

Once stream links are identified 330 and stream linking information defining how a stream in the inner loop is linked to a stream in the outer loop, any direct stream in the outer loop that is not linked to an inner stream, can be eliminated 335 from the stream tree, because from experiments, these streams tend not to bring any benefit to computing performance.

In another step, a stream dependency tree can be stripped down further. Because instructions specific to an ISA must be inserted at the beginning of an outer loop, stream linking information, such as initial values, end values, base addresses, etc., is required at the insert point. Therefore, if such required stream linking information is missing, or if it cannot be made available by inserting additional instructions in an intermediate representation (IR), then the stream and the sub-tree starting from the stream can be eliminated 340.

As final steps, a compiler pass according to an embodiment can generate ISA-specific stream handling instructions through an IR code 345, based on a stream tree, and insert those instructions into the IR code. In a nested loop scenario 310, the insert point is the preheader of an outer loop. Otherwise 310, the insert point is the preheader of an inner loop. The IR code can finally be compiled into code executable by the instruction set architecture of a selected prefetcher A compiler pass according to an embodiment can provide a systematic and reliable method for identifying streams, their dependency relations, and the links between them. It can also provide the flexibility of being applicable to stream-handling instructions specific to different ISAs, and at different scopes: innermost loops versus outer loops in nested loop scenarios. By doing so, a compiler pass can ensure an optimal utilization of the cache-miss reduction capability a stream engine can offer.

The work flow of a compiler pass according to an embodiment can be based on the results of actual experiments. More specifically, the elimination of unused outer streams 335 can be implemented to further eliminate streams with low or negative returns. As a result, when a compiler pass is selecting for which streams to prefetch, it can be responsive to a rate of return.

Embodiments can include a hardware design for a co-designed prefetching scheme, to which further units can be added, and the further additional units can be an embodiment in itself.

Figure 4A:
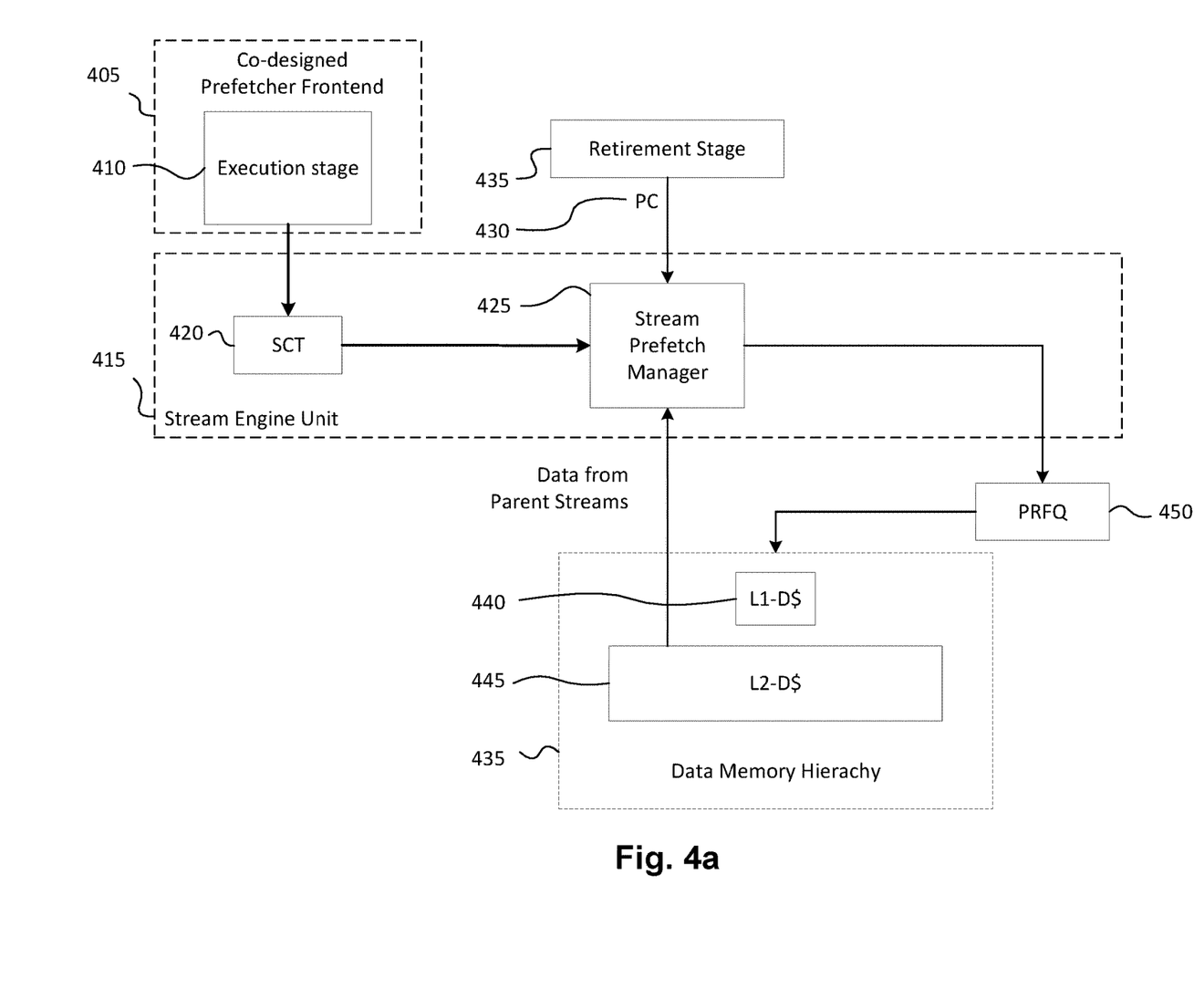
FIG. 4a illustrates a co-designed prefetching system.

FIG. 4a illustrates hardware units involved in implementing co-designed prefetching. A co-designed prefetcher frontend 405 can decode and execute instructions 410, and a main stream engine unit 415 can host a stream configuration table (SCT) 420, as well as a stream prefetch manager 425 which can generate and issue an actual prefetch. The stream prefetch manager 425 can configure a personal computer (PC) 430 from a retirement stage 435 of a pipeline, to adapt to the rate of execution of a loop, through the PC's 430 processor core. The stream prefetch manager 425 can read from a memory hierarchy 435 the data values of streams that it requires, either from a level 1 (L1) data cache 440, or a level 2 (L2) data cache 445, for example. The prefetches generated by the stream prefetch manager 425 can be put into a prefetch queue structure (PRFQ) 450.

Figure 4B:
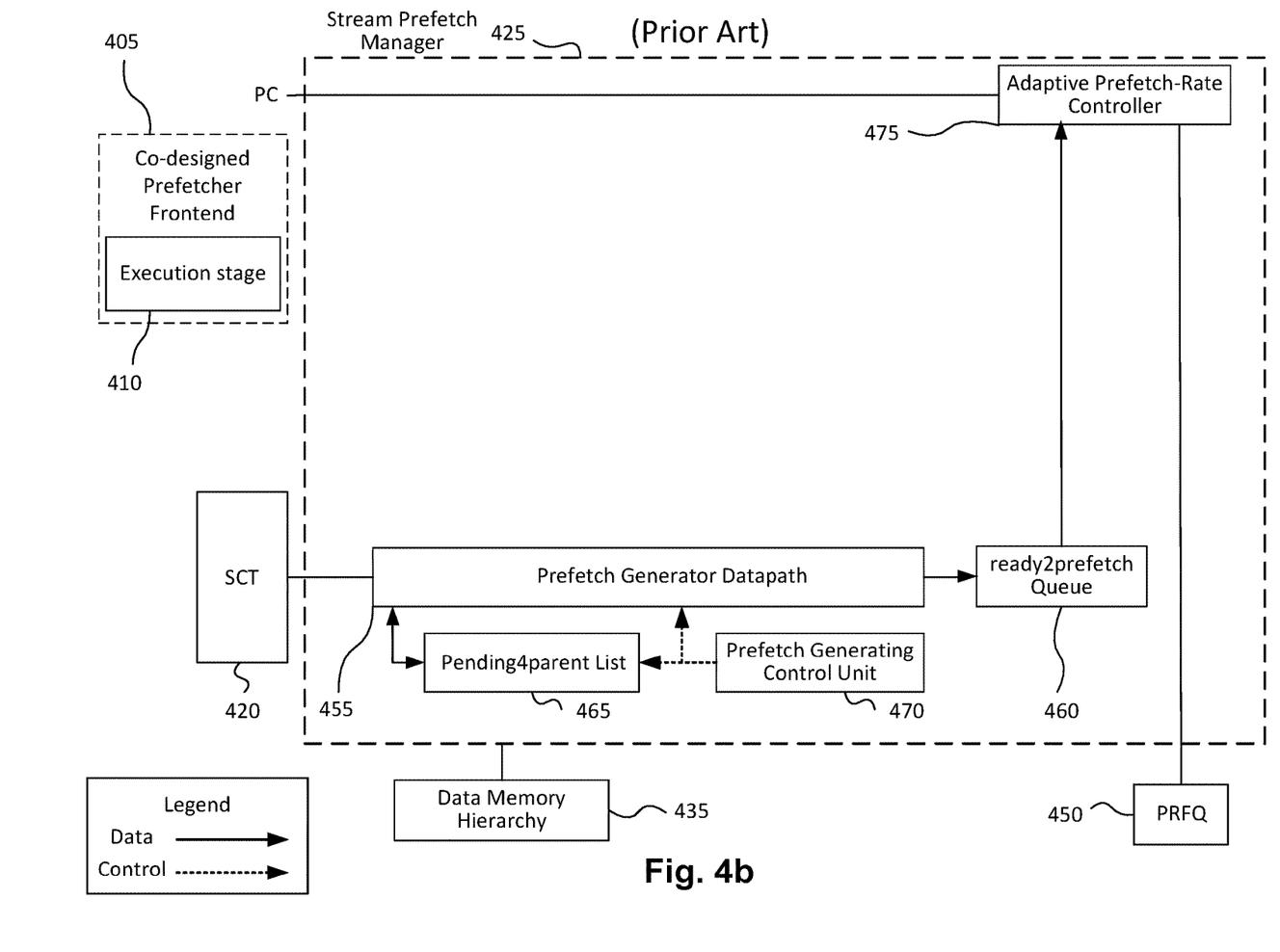
FIG. 4b illustrates further details of a co-designed prefetching system.

FIG. 4b illustrates a stream prefetch manager 425, including some internal components. A prefetch generator datapath 455 is a unit that can produce addresses for the elements of the streams, based on information in a stream configuration table (SCT) 420. If an address is not found in a L1 data cache of a data memory hierarchy 435, a prefetch can be generated for it and put in a "ready2prefetch" queue 460, and the innermost loops (i.e. "children") of the stream can be put into a pending4parent list 465. A prefetch generating control unit 470 can be responsible for controlling these operations. An adaptive prefetch controller 475 can select generated prefetches from the "ready2prefetch" queue 460, and issue them to a memory hierarchy 435 by pushing them into a PRFQ 450.

Embodiments of a co-designed prefetcher operative to receive stream linking information from executable code and prefetch stream data using the stream linking information can include the use of at least one of the following units and functionalities:

- A frontend operative to decode and execute instructions for a stream linking information transfer mechanism,
- The use of master streams,
- The use of subordinate streams,
- A stream prefetch manager,
- Hardware units for handling stream linking information, some of which are in the stream prefetch manager.

Figure 5:
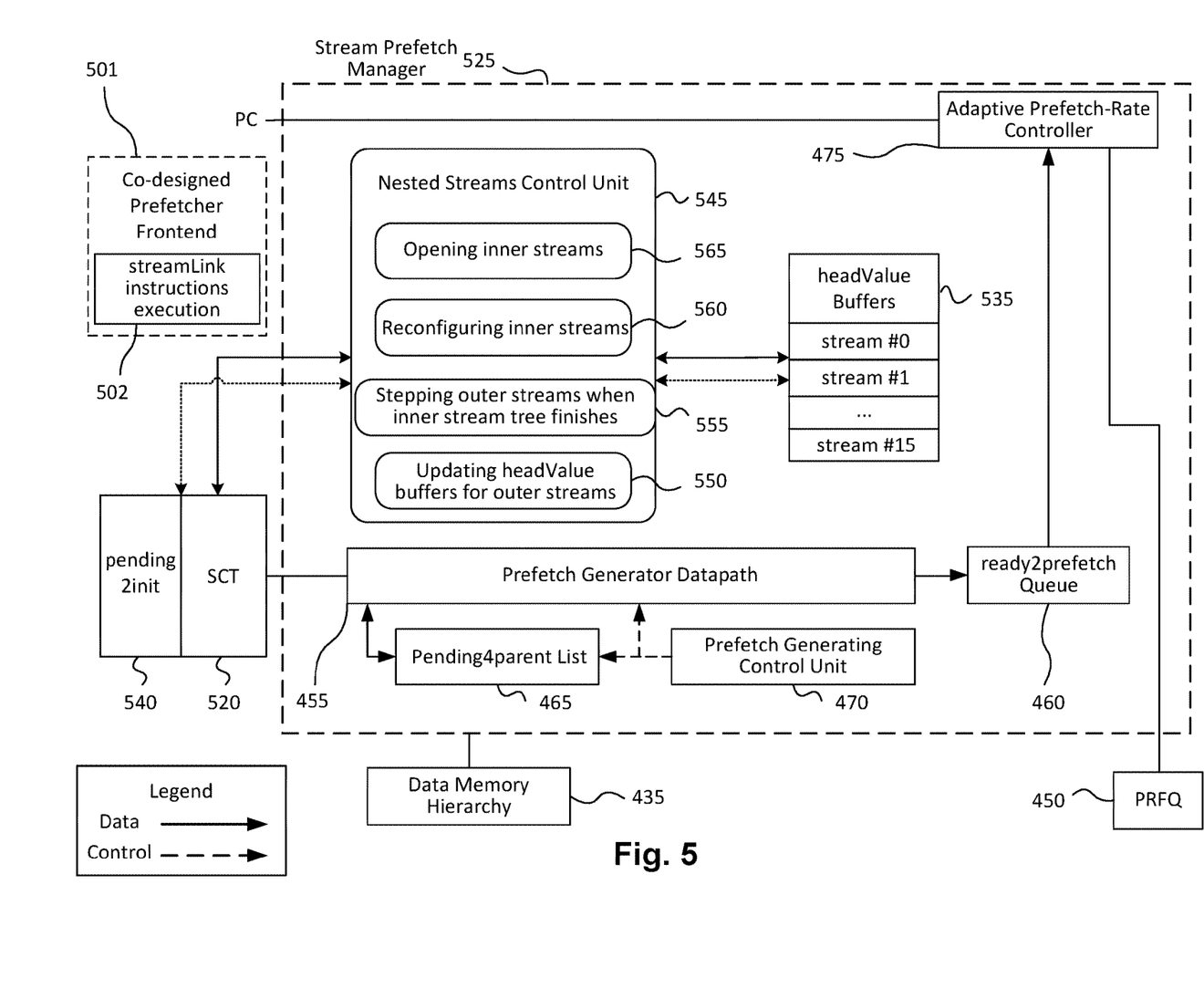
FIG. 5 illustrates a co-designed prefetching system, according to an embodiment.

FIG. 5 illustrates a stream prefetch manager 525, according to an embodiment that includes additional hardware units for using stream linking information.

In an embodiment, a co-designed prefetcher frontend 501 can decode and execute stream-handling instructions (i.e. streamLink instructions including streamOpen and streamClose) 502, and similar mechanisms.

In an embodiment, a stream prefetch manager 525 can store the current values of a master stream's elements, in a buffer for storing data of an outer stream. Therefore, a stream prefetch manager 525 of an embodiment can include a "headValue Buffers" table 535. The length of such a table can be the number of streams supported in a specific implementation. The depth of a buffer can be another implementation choice.

In an embodiment, a subordinate stream can stay pending for values from its master stream. Therefore, an SCT 520 of an embodiment can include a field "pending2init" 540, for inner loop streams to stay pending for values from an outer loop stream.

A stream prefetch manager 525 of an embodiment can include a nested streams control unit 545, which can perform the following operations:

Updating headValue buffers 550 for outer-streams whenever they are not readily available in a L1 data cache.

Stepping an outer stream tree 555 when an inner stream tree finishes its round of execution.

Closing an inner stream tree when it reaches its end value. This can trigger a stepping of the outer stream tree 555, so that it can provide new configuration data for subordinate streams.

Opening 565 and/or re-configuring 560 an inner loop stream in an inner stream tree. An opening 565 can occur at the very first incarnation of an inner stream tree, and re-configuring 560 and/or renewing can occur at subsequent events of reincarnation.

In an embodiment, additional hardware units, as shown in FIG. 5, can allow software-extracted information to be effectively used for efficient prefetching. Because an embodiment can provide an automatic renewal of subordinate streams, it can allow stream-handling instructions to be executed at the level of an outer stream, instead of the level of an inner stream, and this can remove overheads caused by methods and systems of the prior art. Furthermore, by allowing to run ahead and get to future reincarnations of an inner loop, an embodiment can allow a prefetch for them, something that is beyond the capabilities of conventional hardware prefetchers.

Figure 6:
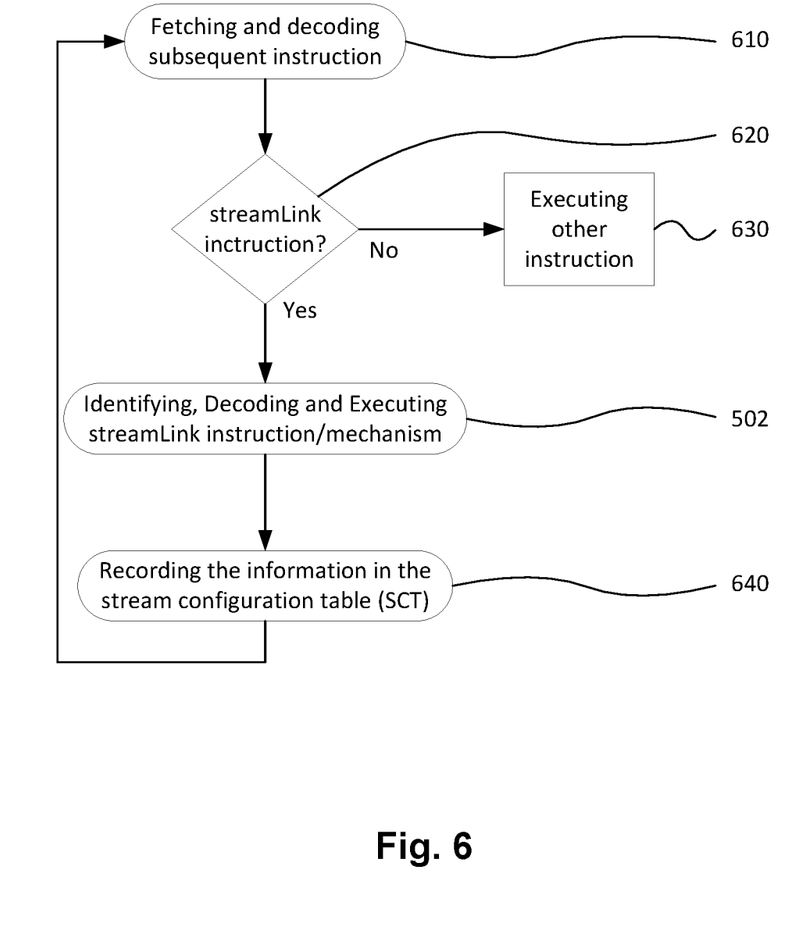
FIG. 6 is a flowchart for a sequence of functions for the frontend hardware component, according to an embodiment.

FIG. 6 is a flowchart for functions of a frontend loop, as they can occur in a co-designed prefetcher frontend 501 which can receive executable code containing stream linking information and streamLink instructions 502 according to an embodiment, the executable code having been compiled for the instruction set architecture of the prefetcher. Initial steps can be to receive and execute a subsequent instruction 610 in the code. If an instruction is not a streamLink instruction 620, it can execute another instruction 630. If an instruction is a streamLink instruction, it can identify, decoding and execute the streamLink instruction/mechanism 502. The frontend 501 can then record 640 the stream linking information from the executable code in a stream configuration table 520.

Figure 7:
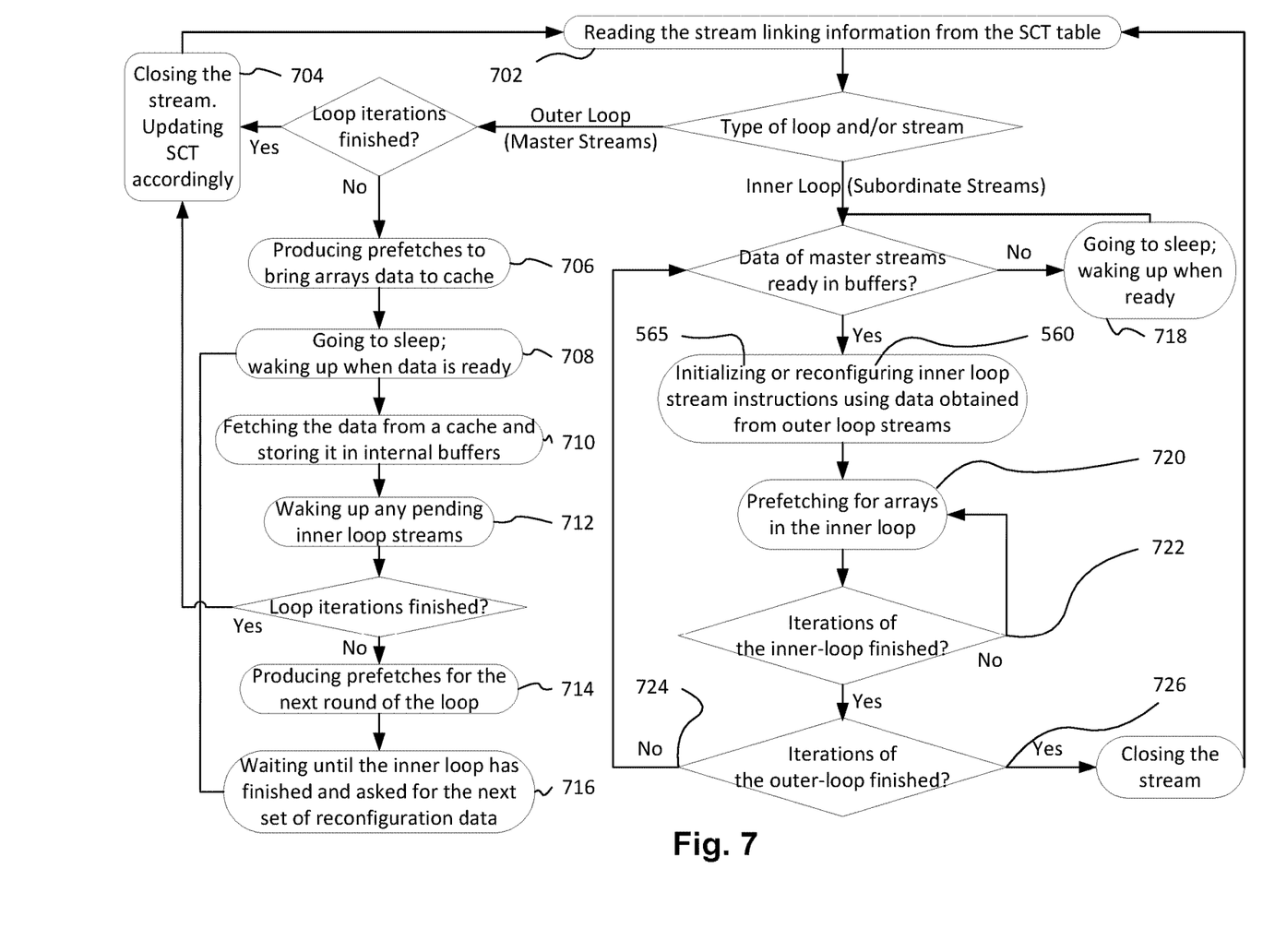
FIG. 7 is a flowchart for a sequence of functions for the backend hardware component, according to an embodiment.

FIG. 7 is a flowchart for functions of backend loops, as they can occur with a stream prefetch manager. A starting point can be for a stream prefetch manager to read 702 stream linking information from the SCT 520.

In FIG. 7, if a loop is an outer loop and the loop iterations are finished, the stream can be closed 704 and the process can start over for a subsequent reading 702. If a loop is an outer loop and the loop iterations are not finished, the stream prefetch manager 525 can produce prefetches to bring arrays into a cache 706 and stay pending until data is ready 708. Then, the stream prefetch manager can fetch data from a cache and store it in internal buffers 710. It can then execute pending inner loop streams 712, and produce a prefetch for each iteration of the loop 714. Once an inner loop has finished and asked for a next round of data 716, the stream can be closed and the SCT be updated accordingly. The SCT then be reread for subsequent stream information 702.

In FIG. 7, if a loop is an inner loop and the data of master streams is not ready in buffers, then the stream prefetch manager can go to sleep and wake up when the data is ready 718. If a loop is an inner loop and the data of master streams is ready in buffers, the stream prefetch manager 525 can initialize 565 or reconfigure 560 inner loop instructions using data obtained from outer loop streams. It can then prefetch for arrays in the inner loops 720. Once the inner loop iterations are finished, but not the outer loops 724, then the stream prefetch manager 525 can verify if more data is ready in the master stream buffers. If the outer loops are finished 726, then the stream can be closed and further information can be read from the SCT 702.

Embodiments can include a software-hardware co-design mechanism for supporting prefetching for nested-streams.

Embodiments can include a mechanism for executing stream-handling instructions (streamOpen, streamClose, streamLink) at the outer loop level of a nested-loop structure, instead of executing them at the inner loop level, and can thus prevent some overheads of conventional methods.

Embodiments can include a software-hardware interface mechanism to allow the transfer of passing stream-linking information to hardware units, and such a software-hardware interface can be referred to as a streamLink mechanism.

Embodiments can include a compiler pass for identifying, in an executable code, opportunities for it to be modified as allowed by additional hardware units, and a stream-linking information mechanism, provided by other aspects of embodiments. A compiler including such compiler pass can also be an embodiment by itself.

Embodiments can include a hardware design that includes additional hardware units for supporting a transfer mechanism of stream-linking information, which transfer mechanism can in turn can support other aspects of embodiments and achieve the benefits of reducing overheads.

Embodiments are not bound to a specific ISA and they can be applied to various processor ISAs, including AArch64, RISC V, and others that can be used in high performance processors, or that might be introduced in the future.

Embodiments can reduce power consumption in a mobile CPU in which power-hungry hardware-prefetching mechanisms are expensive to use. An embodiment can be effectively used to improve performance at low monetary and energy cost.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

An aspect of the disclosure provides a method of prefetching data called by a stream in an inner loop, the inner loop nested in an outer loop of executable code, that includes: identifying, with a compiler analysis, stream linking information defining how the stream in the inner loop is linked to a stream in the outer loop; transferring the stream linking information from the executable code to hardware units of a prefetcher; and prefetching the data using the stream linking information and the hardware units of a prefetcher. According to some embodiments, an inner loop stream can be a subordinate stream to the outer loop stream, an outer loop stream can be a master stream to an inner loop stream, and stream linking information defining how a stream in an inner loop is linked to a stream in an outer loop can include: a subordinate stream identification; a master stream identification, providing an initial value for the subordinate stream's induction variable: an initial value for the subordinate stream identification's, coming from the master stream's identification; a master stream identification, providing an end value for the subordinate stream's induction variable; and an end value for the subordinate stream identification, coming from the master stream's identification; a subordinate stream being a stream in an inner loop that is changed at each iteration of the outer loop, and a master stream being a stream in an outer loop that can change one of: the initial value of the subordinate stream's induction variable; and the end value of the subordinate stream's induction variable; the base address of the subordinate stream. According to some embodiments, an inner loop stream can be a subordinate stream to an outer loop stream, an outer loop stream can be a master stream to an inner loop stream, and stream linking information defining how a stream in an inner loop is linked to a stream in an outer loop can include: an identification for the subordinate stream, and an identification for the master stream, the identification for the master stream providing a base address for the identification of the subordinate stream. According to some embodiments, a compiler analysis of an executable code can include: identifying an inner stream candidate, being a stream in an inner loop, the inner loop nested in an outer loop; determining whether the inner stream candidate corresponds to a qualified nested loop scenario; identifying the outer stream candidate, being a stream in the outer loop nesting the inner loop; using information from the candidate streams to create a stream dependency tree; identifying stream linking information defining how the inner stream is linked to the outer stream; generating stream handling instructions for an intermediate representation code; inserting the stream handling instructions in the intermediate representation code; where a qualified nested loop scenario is a scenario for which applying a method of an embodiment can reduce the number of times a stream handling instruction is executed. According to some embodiments, the properties of a qualified nested loop scenario can include: an outer loop containing only innermost loops; an outer loop having not previously been selected for a corresponding stream handling instruction to be inserted according to a prefetcher's instruction set architecture; and an inner loop stream being potentially linked to the outer loop stream with information including at least one of: an initial value for an induction variable, a final value for an induction variable, and a base address. According to some embodiments, a compiler analysis of an executable code can further include eliminating a stream in an outer loop, that is not linked to a stream in an inner loop. According to some embodiments, a compiler analysis of an executable code can further include eliminating a stream that is missing required stream linking information. According to some embodiments, a compiler analysis of an executable code can further include compiling the intermediate representation code into code executable by the instruction set architecture of a selected prefetcher. According to some embodiments, a compiler analysis of an executable code can further include eliminating a stream candidate not meeting certain criteria, criteria being: for a stream candidate having an induction variable, containing a loop-invariant start value, a loop-invariant end value, and a loop-invariant increment value; for a stream candidate that is a direct stream, containing a loop-invariant base address; for a stream candidate that is an indirect stream, containing a loop-invariant base address; and having an index, the calculation of which performs types of arithmetic operations that are supported by a prefetcher's implemented arithmetic units. According to some embodiments, transferring stream linking information from an executable code to hardware units of a prefetcher can include: receiving with the prefetcher, executable code containing stream linking information, the executable code having been compiled for the instruction set architecture of the prefetcher; executing the code with the prefetcher; recording the stream linking information from the executable code in a stream configuration table (SCT); reading the stream linking information from the SCT, with a stream prefetch manager. According to some embodiments, transferring stream linking information from an executable code to hardware units of a prefetcher can include, for each stream having stream linking information in the SCT, while an outer loop is being iterated: producing prefetches to bring data to a cache; fetching data from a cache and storing it in buffers; producing a prefetch for each iteration of the loop. According to some embodiments, transferring stream linking information from an executable code to hardware units of a prefetcher can include, for each stream having stream linking information in the SCT, while an inner loop is being iterated: reconfiguring an inner loop stream prefetcher using the stream linking information; prefetching for arrays in the inner loop until all iterations are completed. According to some embodiments, transferring stream linking information from an executable code to hardware units of a prefetcher can be performed through a mechanism available with the instruction set architecture (ISA) of the processor incorporating the prefetcher.

An aspect of the disclosure provides a hardware system that can include: a co-designed prefetcher frontend operative to: receive an executable code containing stream linking information, the executable code having been compiled for the instruction set architecture of the co-designed prefetcher; execute the code; record the stream linking information from the executable code in a stream configuration table (SCT); and a stream engine unit containing: a stream configuration table (SCT) in which to record stream linking information from the executable code, and having a field for inner loop streams to stay pending for values from an outer loop stream; and a stream prefetch manager containing: buffers for storing data of an outer stream, and a nested streams control unit operative for: reconfiguring an inner loop stream, and prefetching for arrays in the inner loop until all iterations are completed.

What is claimed is:

1. A method of prefetching data called by a stream in an inner loop, the inner loop nested in an outer loop of executable code, the method comprising:
identifying, with a compiler analysis, stream linking information defining how the stream in the inner loop is linked to a stream in the outer loop;
transferring the stream linking information from the executable code to hardware units of a prefetcher; and prefetching the data using the stream linking information and the hardware units of a prefetcher;

wherein the compiler analysis comprises:

identifying an inner stream candidate, being the stream in the inner loop, the inner loop nested in the outer loop;

determining whether the inner stream candidate corresponds to a qualified nested loop scenario;

identifying the outer stream candidate, being a stream in the outer loop nesting the inner loop;

using information from the candidate streams to create a stream dependency tree;

identifying the stream linking information defining how the inner stream is linked to the outer stream;

generating stream handling instructions for an intermediate representation code;

inserting the stream handling instructions in the intermediate representation code; and where the qualified nested loop scenario is a scenario for which the number of times a stream handling instruction is executed can be reduced.

2. The method of claim 1, wherein:

the inner loop stream is a subordinate stream to the outer loop stream;

the outer loop stream is a master stream to the inner loop stream, the stream linking information includes:

a subordinate stream identification;

a master stream identification, providing an initial value for the subordinate stream's induction variable;

an initial value for the subordinate stream identification's, coming from the master stream's identification;

a master stream identification, providing an end value for the subordinate stream's induction variable;

an end value for the subordinate stream identification, coming from the master stream's identification; and a subordinate stream being a stream in an inner loop that is changed at each iteration of the outer loop, and a master stream being a stream in an outer loop that can change one of:

the initial value of the subordinate stream's induction variable, the end value of the subordinate stream's induction variable, and a base address of the subordinate stream.

3. The method of claim 1, wherein the inner loop stream is a subordinate stream to the outer loop stream;

the outer loop stream is a master stream to the inner loop stream; and the stream linking information includes an identification for the subordinate stream, and an identification for the master stream, the identification for the master stream providing a base address for the identification of the subordinate stream.

4. The method of claim 1, where the properties of a qualified nested loop scenario include:

the outer loop containing only innermost loops;

the outer loop having not previously been selected for a corresponding stream handling instruction to be inserted according to a prefetcher's instruction set architecture;

the inner loop stream being potentially linked to the outer loop stream with information including at least one of:

an initial value for an induction variable;

a final value for an induction variable;

a base address.

5. The method of claim 1, further comprising eliminating a stream in the outer loop that is not linked to a stream in an inner loop.

6. The method of claim 1, further comprising eliminating a stream that is missing required stream linking information.

7. The method of claim 1, further comprising compiling the intermediate representation code into code executable by the instruction set architecture of a selected prefetcher.

8. The method of claim 1, further comprising eliminating a stream candidate not meeting certain criteria, criteria being:

for a stream candidate having an induction variable, containing a loop-invariant start value, a loop-invariant end value, and a loop-invariant increment value;

for a stream candidate that is a direct stream, containing a loop-invariant base address;

for a stream candidate that is an indirect stream, containing a loop-invariant base address; and having an index, the calculation of which performs types of arithmetic operations that are supported by a prefetcher's implemented arithmetic units.

9. The method of claim 1, where transferring stream linking information from the executable code to hardware units of a prefetcher comprises:

receiving with the prefetcher, executable code containing stream linking information, the executable code having been compiled for the instruction set architecture of the prefetcher;

executing the code with the prefetcher;

recording the stream linking information from the executable code in a stream configuration table (SCT); and reading the stream linking information from the SCT, with a stream prefetch manager.

10. The method of claim 9, further comprising, for each stream having stream linking information in the SCT, while an outer loop is being iterated:

producing prefetches to bring data to a cache;

fetching data from a cache and storing it in buffers; and producing a prefetch for each iteration of the loop.

11. The method of claim 9, further comprising, for each stream having stream linking information in the SCT, while an inner loop is being iterated:

reconfiguring an inner loop stream prefetcher using the stream linking information; and prefetching for arrays in the inner loop until all iterations are completed.

12. The method of claim 9, wherein transferring the stream linking information from the executable code to hardware units of a prefetcher is performed through a mechanism available with the instruction set architecture (ISA) of the processor incorporating the prefetcher.

* * * * *